(12) United States Patent
Hänsel et al.

(10) Patent No.: US 6,464,298 B1
(45) Date of Patent: Oct. 15, 2002

(54) ADJUSTER FOR A VEHICLE SEAT

(75) Inventors: Richard Hänsel, Flonheim (DE); Eckhard Nock, Worms (DE); Timo Bauer, Schwarzerden (DE)

(73) Assignee: Keiper GmbH & Co., Kaiserslautern (DE)

( * ) Notice: Subject to any disclaimer, the term of this patent is extended or adjusted under 35 U.S.C. 154(b) by 0 days.

(21) Appl. No.: 09/556,083

(22) Filed: Apr. 21, 2000

(30) Foreign Application Priority Data

Apr. 24, 1999 (DE) ............................ 199 18 718

(51) Int. Cl.⁷ .................................. B60N 2/02
(52) U.S. Cl. ........................................ 297/366
(58) Field of Search ........................ 297/366, 367, 297/368, 369, 362.12

(56) References Cited

U.S. PATENT DOCUMENTS 4,591,207 A * 5/1986 Nithammer et al.
5,984,412 A * 11/1999 Magyar
6,017,090 A * 1/2000 Bonk
6,279,994 B1 * 8/2001 Gehart

FOREIGN PATENT DOCUMENTS

| DE | 80 12 404 U1 | 5/1992 |
| DE | 42 40 943 A1 | 5/1994 |
| EP | 0 856 428 A2 | 8/1998 |

* cited by examiner

*Primary Examiner*—Milton Nelson, Jr.
(74) *Attorney, Agent, or Firm*—Alston & Bird LLP

(57) ABSTRACT

An adjuster for a vehicle seat includes a bearing element and a toothed element that includes a plurality of teeth. The toothed element is mounted to be capable of moving relative to the bearing element. The adjuster further includes a pawl floatably supported by the bearing element so that it is capable of both pivoting relative to the bearing element and moving along the toothed element. The pawl is movable between locked and unlocked positions. The pawl floats into the locked position by pivoting into contact with at least one tooth of the toothed element and moving along the toothed element to permit a proper engagement between the pawl and the teeth of the toothed element.

19 Claims, 7 Drawing Sheets

ADJUSTER FOR A VEHICLE SEAT

BACKGROUND OF THE INVENTION

The invention relates to an adjuster for a vehicle seat, in particular for an automobile seat, wherein the adjuster includes a toothed element and a pawl, both of which are mounted for moving relative to a bearing element, and the pawl cooperates with the toothed element to restrict movement of the toothed element relative to the bearing element.

A known adjuster of this kind, which is used as a linear adjuster for an automobile seat, comprises a rack, which is a toothed element, and an elongate housing, which is a bearing element. The rack and housing are adapted for sliding movement relative to each other in the unlocked state of the adjuster, thereby changing the overall length of the adjuster. In the housing, a pawl or rocking arm is mounted for rotation about a pin. The pawl is adapted for engaging with its teeth the teeth of the rack, so that the adjuster is locked. In this locked position, the pawl is held by a cam or cam plate. A disadvantage with the use of this known adjuster is that the adjustment of the overall length of the adjuster can occur only in certain steps, which are predetermined by the tooth pitch of the rack, and the adjuster cannot engage when a tooth comes to lie on a tooth in a tip-to-tip fashion upon engagement of the pawl.

SUMMARY OF THE INVENTION

The present invention solves the above and other problems by providing an adjuster including a toothed element mounted for moving relative to a bearing element, and a pawl floatably supported on the bearing element so that the pawl can cooperate with the toothed element to restrict movement of the toothed element relative to the bearing element. In accordance with one aspect of the present invention, the adjuster is incorporated into an automobile seat, or the like.

As a result of floatably supporting the pawl on the bearing element, it is capable of pivoting relative to the bearing element in its pivoting direction and is also movable in a further direction relative to the bearing element. Because of the floatably supporting, the pawl is capable of performing a translational motion (or a motion in the circumferential direction), and can slide at least a short distance along the toothed element, so that when it engages, it is possible to avoid or eliminate a positioning of tooth on tooth in a tip-to-tip fashion. A preferred floating support that is efficient to produce is partially provided by an elongate hole, which can be provided in the pawl or in the bearing element.

Preferably, the floating support is controlled by an eccentric element, which converts the translational portion of the pawl motion into a rotation, which is simpler to interrupt, for example, by a locking element that can lock the eccentric element. It is preferred to construct the eccentric element in one piece or in two pieces. While a one-piece eccentric element is more cost-favorable to manufacture, a bipartite eccentric element can encircle the bearing of the pawl in the locked state and adjust it free of play. Preferably, the locking element engages the eccentric element by means of a gear tooth system, which is finer than a gear tooth system between the toothed element and the pawl. This provides a locking engagement which has less steps and is even almost stepless in the case of a very fine gear tooth system.

In a preferred construction, the pawl is adapted for movement by means of a control member at least in part along the toothed element. A positioning of a tooth on a tooth, in a tip-to-tip fashion, upon engagement will automatically be removed during the locking procedure. The first engaging tooth of the pawl, i.e., the tooth with the shortest distance from the bearing element, may be made somewhat shorter than the other teeth, so that upon obliquely impacting, it comes to engage between two teeth of the toothed element.

The adjuster of the present invention may be designed and constructed either as a linear adjuster, for example, as a longitudinal or a vertical adjuster, or as a rotary adjuster, for example, as a locking mechanism. This adjuster can be used in particular in an automobile seat. As one example, when constructed as a longitudinal adjuster, the toothed element and the housing for supporting the pawl can each be integrated in separate rails. In this instance, the rails extend within each other.

BRIEF DESCRIPTION OF THE DRAWINGS

In the following, the invention is described in greater detail with reference to two embodiments illustrated in the drawings, in which.

DETAILED DESCRIPTION OF THE INVENTION

Figure 1:
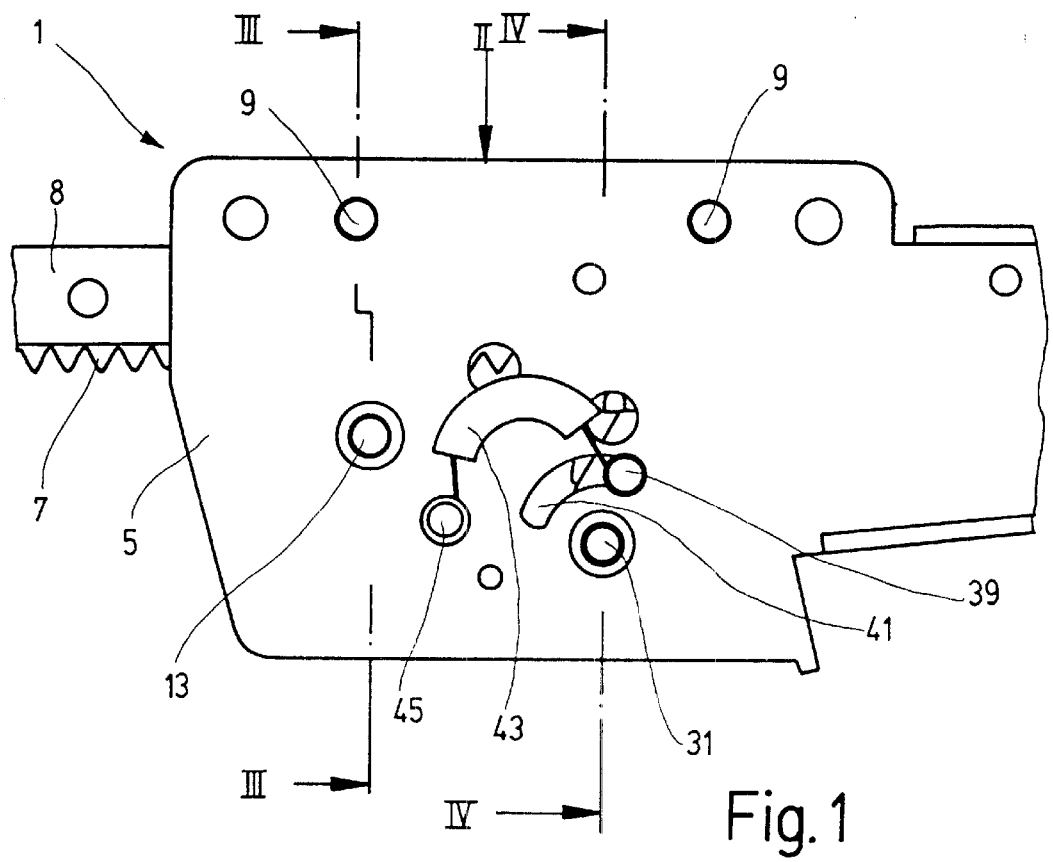
FIG. 1 is a side view of a first adjuster according to the invention.
Figure 2:
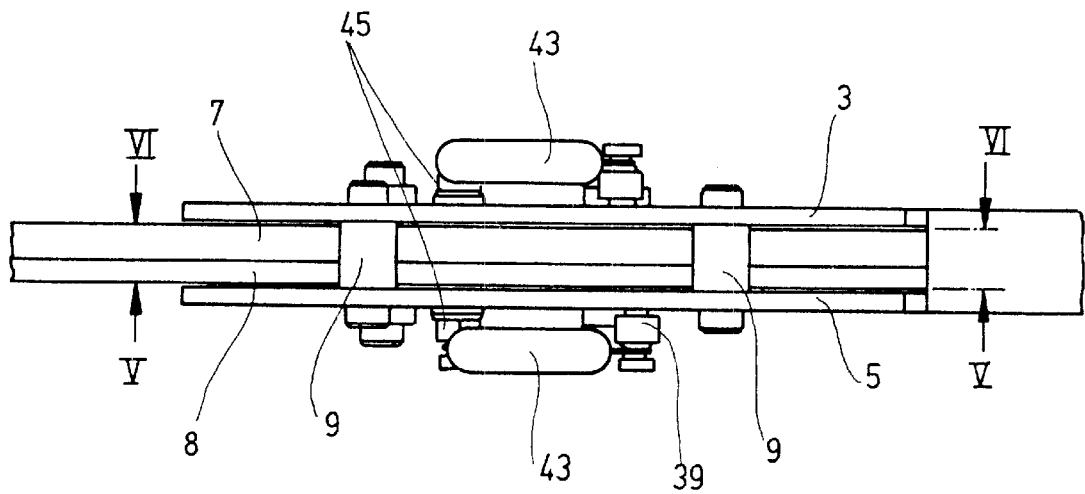
FIG. 2 is a top view of the adjuster in direction of arrow II of FIG. 1.
Figure 3:
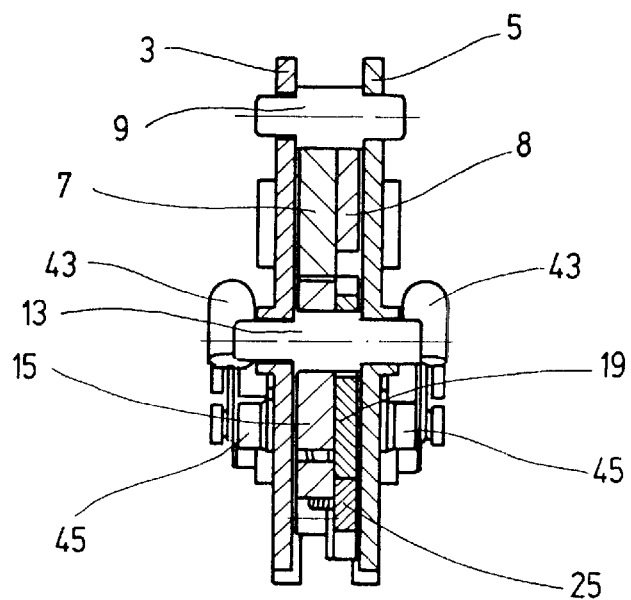
FIG. 3 is a cross-sectional view of the adjuster along line III—III of FIG. 1.
Figure 4:
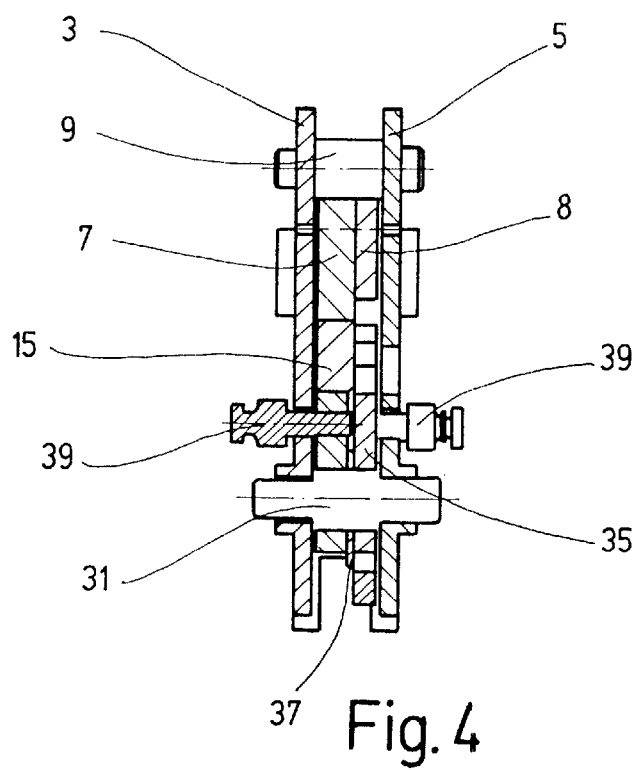
FIG. 4 is a cross-sectional view of the adjuster along line IV—IV of FIG. 1.
Figure 5:
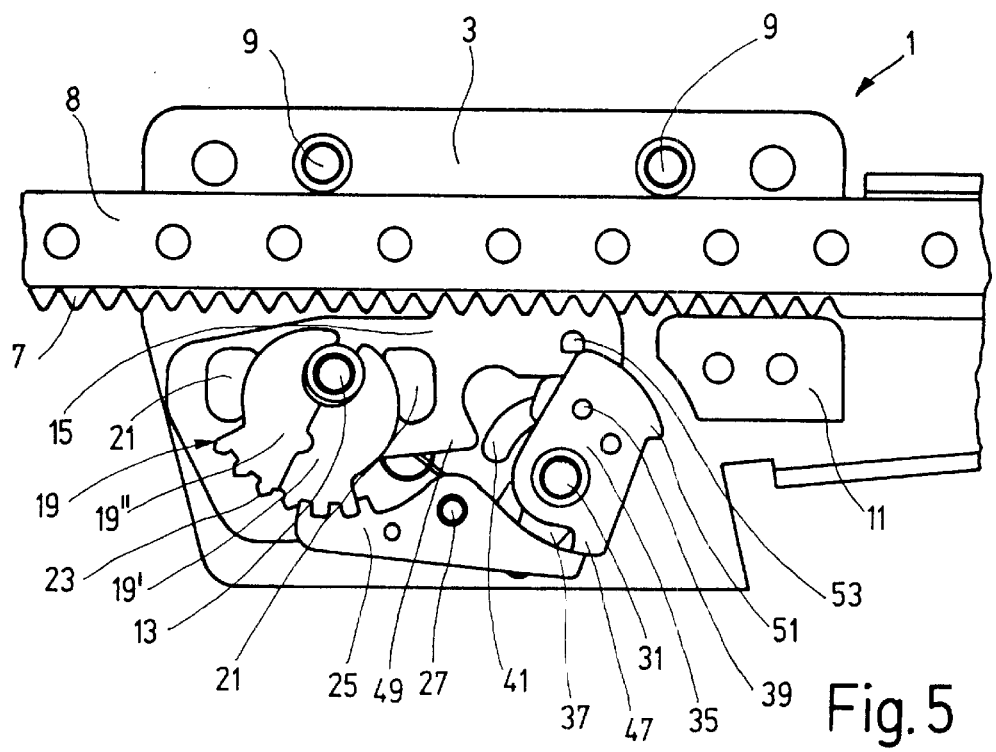
FIG. 5 is an axially sectioned view of the adjuster along line V—V of FIG. 2.
Figure 6:
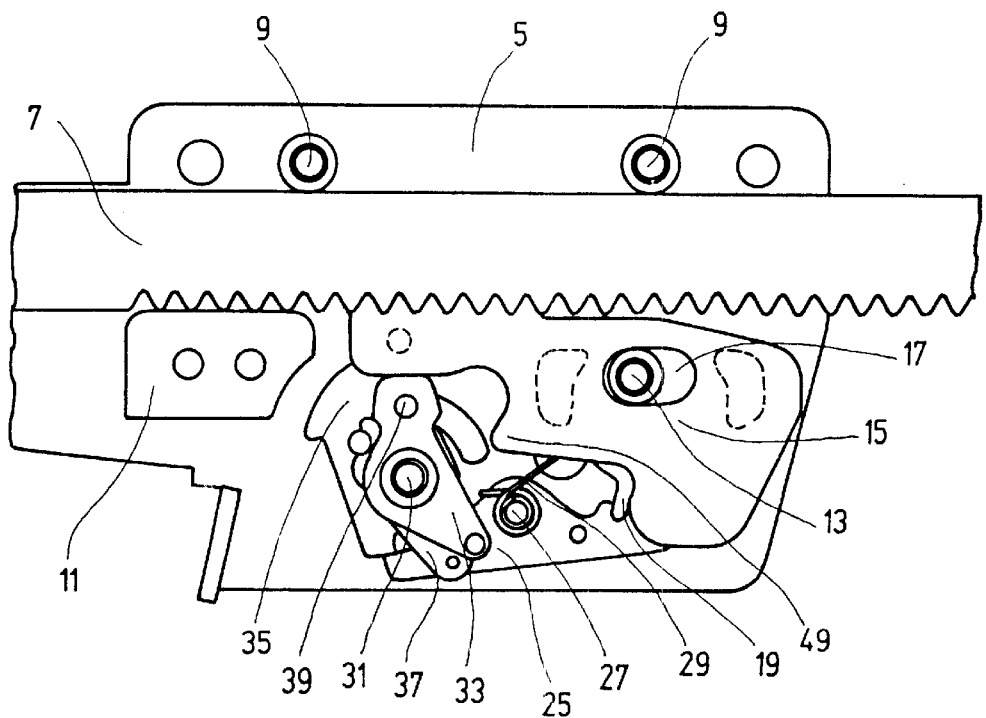
FIG. 6 is an axially sectioned view of the adjuster along line VI—VI of FIG. 2.

The first embodiment relates to an adjuster 1 that is designed and constructed as a linear adjuster. The adjuster 1 comprises a housing plate 3 and a housing cover 5, which are almost identical plate-shaped parts, each having a head portion and an adjoining, elongate, narrower, and narrowing leg portion. The housing plate and cover 3, 5 are spaced apart from one another and connected by pins that are each provided, for example, with a screw thread over a portion of their length. The housing plate 3 is used such that its head portion functions as a bearing element.

A rack 7 functions as a toothed element and includes a coarse gear tooth system of wedge-shaped teeth on one of its longitudinal sides. The rack 7 extends between the housing plate 3 and housing cover 5, from the side facing away from the leg portions in the direction toward the leg portions. On its side facing the housing cover 5, the rack 7 comprises a strip 8, which enlarges the width of the rack. The side of the rack 7 that faces away from the gear tooth system lies against two slide pins 9, which simultaneously interconnect the housing plate 3 and housing cover 5. On its side carrying the gear tooth system, the rack 7 lies against a slide member 11 arranged on housing plate 3. The rack 7 is guided by the slide pins 9 and slide member 11 such that it is movable in its axial direction relative to the housing plate 3, but otherwise exhibits only a small play. That is, the adjuster 1 can be characterized as a linear adjuster because the rack 7 is generally straight so that the rack and housing, which includes the housing plate and cover 3, 5, are selectively movable relative to one another along a generally straight path.

A pawl pin 13, which likewise interconnects the housing plate 3 and housing cover 5, floatably mounts a pawl 15, i.e., the pawl 15 surrounds the pawl pin 13 by means of an elongate hole 17, which extends approximately in the longitudinal direction of the rack 7. The long side of the pawl 15 faces the rack 7. By a pivotal movement, the pawl 15 moves toward the rack 7, and is able to engage rack 7 by means of some teeth provided on pawl 15. The length of the elongate hole 17 is somewhat greater than the spacing between two teeth of rack 7.

The movement of pawl 15 within the elongate hole 17, namely its floating support, is controlled by a bipartite cam plate 19 that functions as an eccentric element. The cam plate 19 has an approximately circular cross section and is arranged on the side of pawl 15 which faces the housing cover 5. The pawl pin 13 extends between a first cam plate portion 19' and a second cam plate portion 19" along the separating line between the two cam plate portions 19' and 19" and outside of the center of cam plate 19. The two cam plate portions 19' and 19" are both approximately semicircular, and the sides of the two cam plate portions that face each other together define receptacle that is in receipt of the pawl pin 13. In addition, the first cam plate portion 19' comprises a small receptacle for a projection of the second cam plate portion 19". The cam plate 19 is mounted between two concave bearing members 21, which both project from the pawl 15. The two bearing members 21 hold the two cam plate portions 19' and 19" together, but allow a large play. When the pawl 15 translates as allowed by the elongate hole 17, the cam plate 19 rotates due to its eccentricity. When the pawl 15 pivots about pawl pin 13, it carries along the cam plate 19 due to friction.

On the side distant from pawl pin 13, the two cam plate portions 19' and 19" comprise on their circumferential surface a gear tooth system 23, which is finer than the tooth pitch of rack 7. The cam plate 19 carries its gear tooth system 23 on its side facing away from rack 7, and moves it between the two bearing members 21. A locking lever 25 is mounted for rotation on a pin 27 arranged parallel to pawl pin 13. On one of its arms, the locking lever 25 is provided with some teeth, which allow it, after a rotation toward the cam plate 19, to engage the gear tooth system 23 thereof, and to block the cam plate 19. A leg spring 29 surrounds the locking lever pin 27 and pushes with one of its ends against the pawl 15, namely in the direction toward the rack 7, and engages with its other end the locking lever 25, so that it pushes the locking lever away from cam plate 19.

A pin 31, which spaces in like manner as slide pin 9 and pawl pin 13 the housing plate 3 from housing cover 5 and simultaneously interconnects same, mounts for rotation an actuating member 33 in the plane of pawl 15, a control member 35 in the plane of cam plate 19 and locking lever 25, and an unlocking lever 37 between the actuating member 33 and the control member 35. A control pin 39 extends through both the control member 35 and the actuating member 33. The control pin 39 is arranged parallel to the pin 31 of the actuating member, is guided in the region of its end sections in guide slots 41 respectively arranged both in the housing plate 3 and housing cover 5. The arcuate guide slots 41 surround the actuating member pin 31 in the shape of a quarter circle, namely approximately from a connecting line extending between the actuating member pin and the pawl pin 13 to a connecting line extending between the actuating member pin and the nearest point of rack 7. The opposite ends of the control pin 39 respectively extend beyond the housing plate 3 and housing cover 5, and each of those ends mounts an end of a respective helical bending spring 43. With their other ends, the helical bending springs 43 are each attached to pins 45 projecting from the outside of the housing plate 3 and housing cover 5 respectively.

When the adjuster is locked as shown in FIGS. 1–6, the helical bending springs 43 press the control pin 39 to the ends of guide slots 41 that are closer to the rack 7, so that the actuating member 33 pushes on pawl 15. The latter in turn pushes against rack 7 and holds it without play in form fitting engagement and due to the wedge shape of the teeth. At its end facing away from control pin 39, the control member 35 is provided with a blocking cam 47. With this blocking cam 47, the control member 35 pushes against the arm of locking lever 25 that faces away from the cam plate 19. Consequently, the locking lever 25 is pushed against the force of leg spring 29 toward the cam plate 19 and meshes with its gear tooth system 23. At the same time, the leg spring 29 also pushes the pawl 15 against rack 7. Under the load, the cam plate portions 19' and 19" lie, while largely eliminating a play, against the bearing elements 21, so that they clamp the pawl pin 13 and, thus, lock the position of pawl 15 and the elongate hole 17 relative to the pawl pin 13. The pawl 15 is then unable to displace relative to pawl pin 13, i.e., it is free of play in all directions.

For disengaging the adjuster, the unlocking lever 37 is pulled via a Bowden cable. As it pivots, the unlocking lever 37 entrains the actuating member 33 and control member 35. As a result, the control pin 39 moves against the force of helical bending springs 43 in the direction toward the other end of guide slots 41. The blocking cam 47 leaves the locking lever 25, so that the leg spring 29 is able to pivot the locking lever 25 away from cam plate 19. At the same time, the actuating member 33 releases pawl 15. The floatably supported pawl 15 is thus able to move again. Shortly before the control pin 39 reaches the end of guide slots 41, the actuating member 33 arrives at a projection 49 of pawl 15, which is entrained by the actuating member 33, whereby the actuating member 33 pivots on the one hand the pawl 15 away from rack 7, and on the other hand pushes it somewhat away from itself, so that the pawl pin 13 does not lie against the end of elongate hole 17 which faces away from actuating member 33. The rack 7 is now again freely movable in its axial direction.

Figure 7:
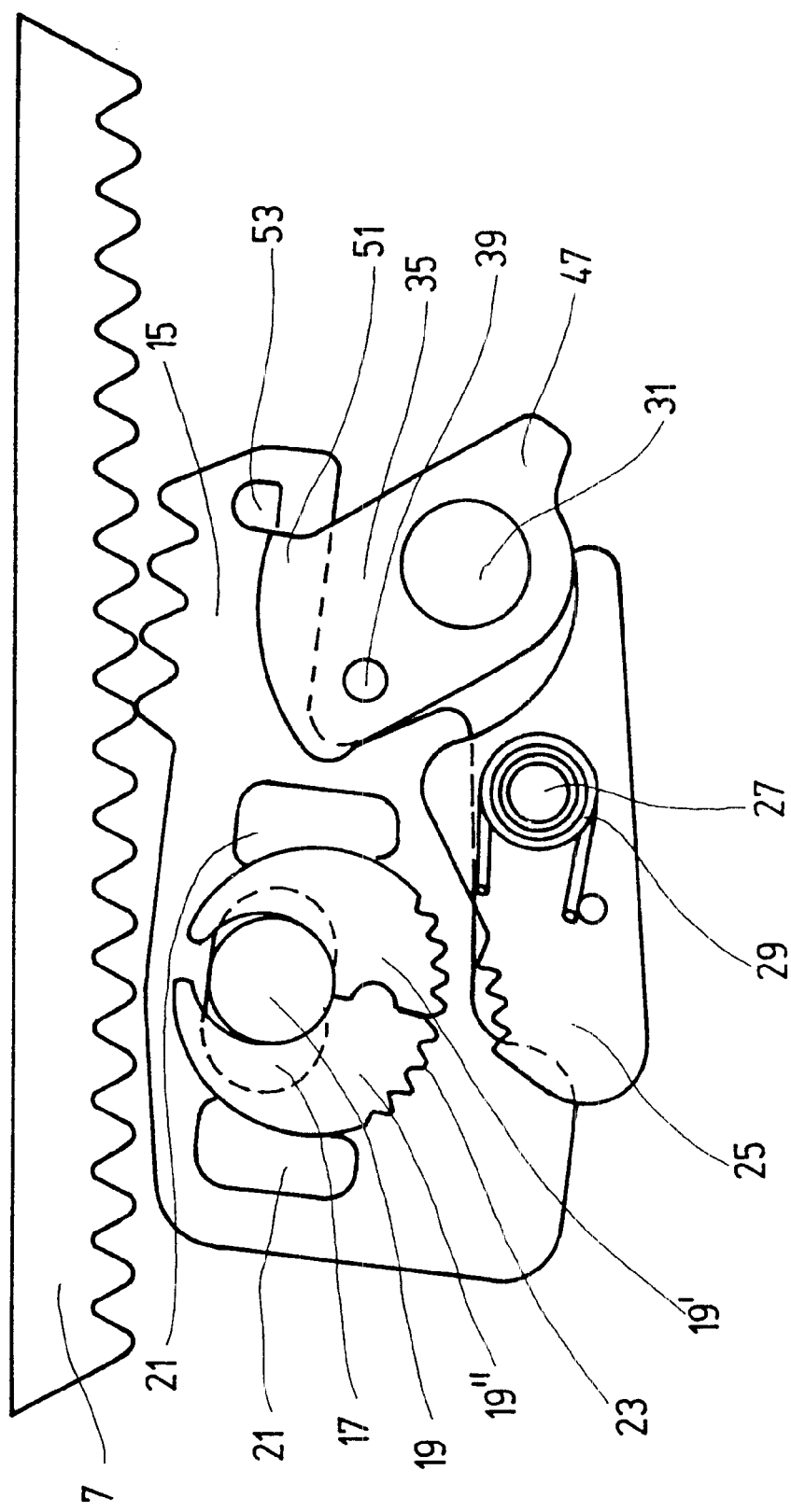
FIG. 7 is a schematic view of the adjuster before locking.

For engaging the adjuster 1, the unlocking lever 37 is released, whereby the helical bending springs 43 push the control pin 39 in the direction of the other end of guide slots 41. The control pin 39 entrains control member 35 and actuating member 33. The actuating member 33 starts to push the pawl 15 in the direction toward the rack 7. The control member 35 has a nose 51 formed in its corner that pivots toward the pawl 15. This nose 51 enters the region of an individual shoulder 53 formed in the plane of cam plate 19 and projecting from the pawl 15. If the pawl 15 come into contact with the rack 7 so that a tooth comes to lie on a tooth in a tip-to-tip manner, as shown in FIG. 7, the nose 51 of control member 35 contacts the shoulder 53 and entrains it and, thus, the pawl 15. As a result, the pawl 15 is displaced in the longitudinal direction of rack 7, so that there is no longer the tip-to-tip interaction between the teeth, and the pawl 15 is able to come into sliding contact therewith. At the same time, the elongate hole 17 displaces relative to the pawl pin 13. As a result of the displacement beyond the projection 49 during the unlocking procedure, it is made sure that the pawl pin 13 is not located at the end of elongate hole 17 facing away from shoulder 53. The pawl 15 is now able to engage rack 7, if need be after an axial movement relative to the rack 7. This relative movement is on the order of the tooth pitch, and it is allowed by the floating support via the elongate hole 17. The cam plate 19 adapts itself, while eliminating or at least minimizing its play. At the end of the pivotal movement of control member 35, the blocking cam 47 thereof reaches locking lever 25 and pivots it such that it engages the gear tooth system 23 of cam plate 19 and blocks same. With that, the previously described engaged state is again reached.

Figure 8:
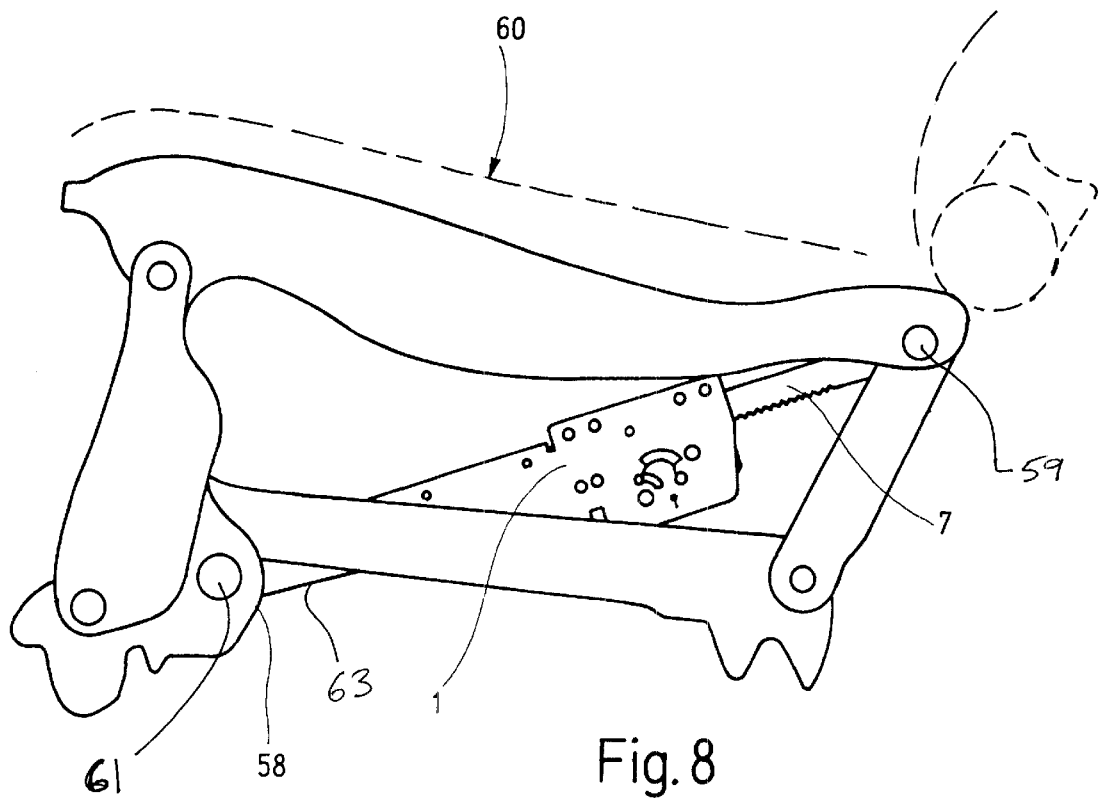
FIG. 8 is a schematic view of a vehicle seat with an adjuster of the present invention, wherein the adjuster is a linear adjuster and functions as a locking mechanism and the seat is upholstered.
Figure 9:
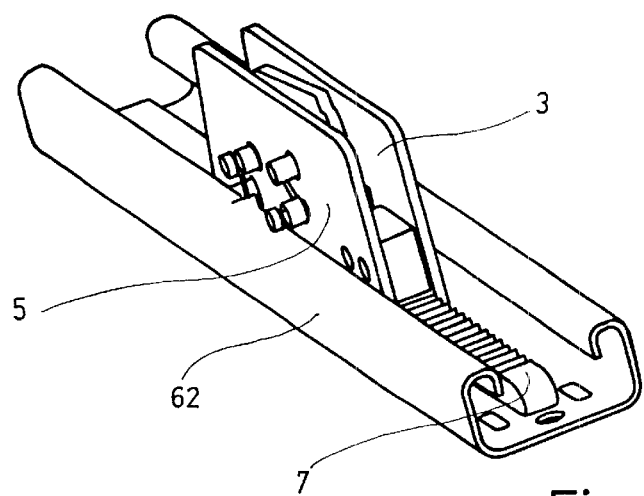
FIG. 9 is a schematic view of an adjuster according to the invention, which is used as a longitudinal adjuster in a vehicle seat.

For example, as shown in FIG. 8, the described adjuster 1 is used in a seat structure 58 of a seat 60 for an automobile, which can be folded to an upright position, when not in use, or a package position. The rack 7 is pivotably connected to a first pivot 59 of the seat structure 58, and the housing, which includes the housing plate and cover 3, 5, is pivotably connected to a second pivot 61 of the seat structure by a rod 63 mounted between the housing and the second pivot. An adjuster 1 can also be used as an axial adjuster, as shown in FIG. 9, in which the rack 7 connects to a lower rail 62 secured to the vehicle structure, whereas the housing plate 3 and housing cover 5 and all structural parts therebetween are mounted to an upper rail that is secured to the seat structure.

The second embodiment relates to a locking mechanism 101, which can also be characterized as an adjuster, namely a rotary adjuster. To the extent that its structural parts have the same function as the structural parts of the first embodiment, they are provided in the following with numerals increased by 100. The locking mechanism 101 comprises a lower part 103 as a bearing element and an upper part 106, which is supported relative thereto for rotation about a center axle 104. The center axle 104 is constructed as a cylindrical pin with an inner profile cut out therefrom. In concentric relationship with the center axle 104, the upper part 106 of the mechanism mounts an annular gear rim 107 forming a toothed element, which extends with its gear tooth system radially inward.

From the lower part 103 of the mechanism, a pawl pin 113 projects, within the gear rim 107, parallel to the center axle 104. The pawl pin 113 floatably supports a pawl 115 with an elongate hole 117 directed approximately in the circumferential direction. Therefore, the pawl 115 is capable both of pivoting about the pawl pin 113 in the radial direction toward the gear rim 107 and away therefrom and of displacing in the circumferential direction relative to the gear rim 107. The length of the elongate hole 117 is somewhat greater than the tooth pitch of gear rim 107. On its side facing the gear rim 107, the pawl 115 is provided with some teeth, which permit it to mesh with the gear tooth system of gear rim 107.

On the side of the pawl 115 facing away from the lower part 103 of the mechanism, the pawl pin 113 is surrounded by a cam plate 119, which is rotatably supported with a play between two bearing members 121 that project from pawl 115. The cam plate 119 is constructed identical with the cam plate 19 of the first embodiment. In particular, it is made in two pieces for a compensation of play. A corresponding gear tooth system 123 on the side of cam plate 119 opposite to the receptacles for the pawl pin 113 is directed approximately in the direction of center axle 104. This gear tooth system 123 is finer than the gear tooth systems of gear rim 107 and pawl 115.

An elongate locking slide 125 encloses the center axle 104 with a second elongate hole 126 extending in its longitudinal direction. A guide member 130 projecting from the lower part 103 of the locking mechanism and having an angular, approximately U-shaped profile guides the locking slide 125 in the plane of cam plate 119 such that it is aligned in the radial direction with the pawl pin 113 and adapted for movement toward and away from same. At its end aligned with the pawl pin 113, the locking slide 125 is provided with some teeth, which enable it to mesh with cam plate 119.

Between the locking slide 125 and the lower part 103 of the locking mechanism, a control member 135 is rotatably mounted on center axle 104. The control member 135 has an approximately three-arm basic form. Its first arm facing away from pawl 115 mounts a control pin 139, which extends through a guide slot 141 in locking slide 125 for moving same. The guide slot 141 extends slightly obliquely to the circumferential direction and has a radially further outward situated end and a radially further inward situated end.

Figure 10:
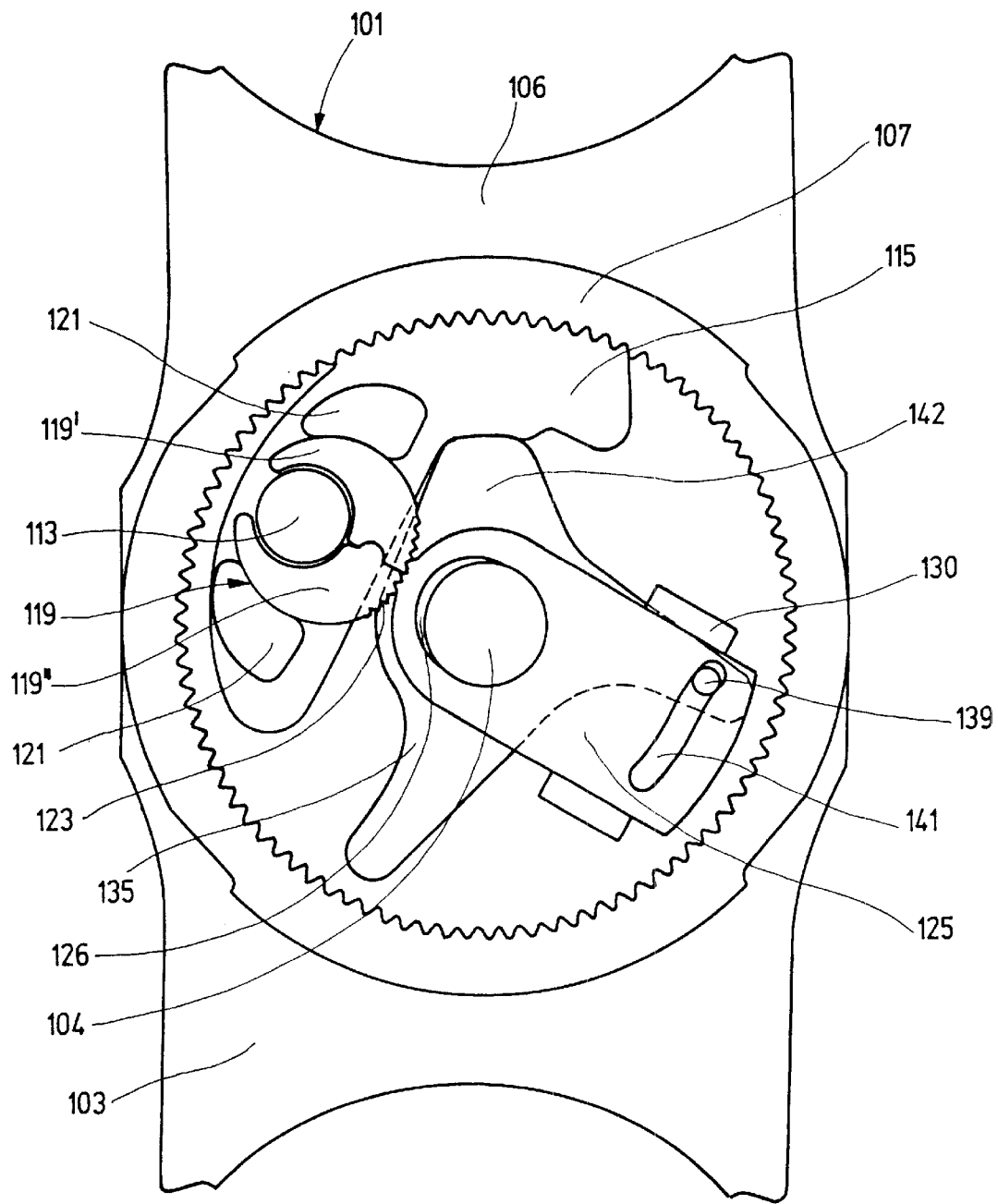
FIG. 10 is a partially sectioned side view of a locking mechanism as a second adjuster according to the invention in an engaged state.

In the engaged state of the locking mechanism 101, as shown in FIG. 10, the control member 135 is rotated such that it pushes with its second arm designed and constructed as a clamping arm 142 against pawl 115 and keeps same engaged with the gear rim 107. In this instance, the control pin 139 is at the radially further outward situated end of the guide slot 141. The locking slide 125 is pushed against the cam plate 125, engages with its teeth the gear tooth system 123 of cam plate 119, and blocks same. The cam plate 119 secures the position of the elongate hole 117 relative to the pawl pin 113.

Figure 11:
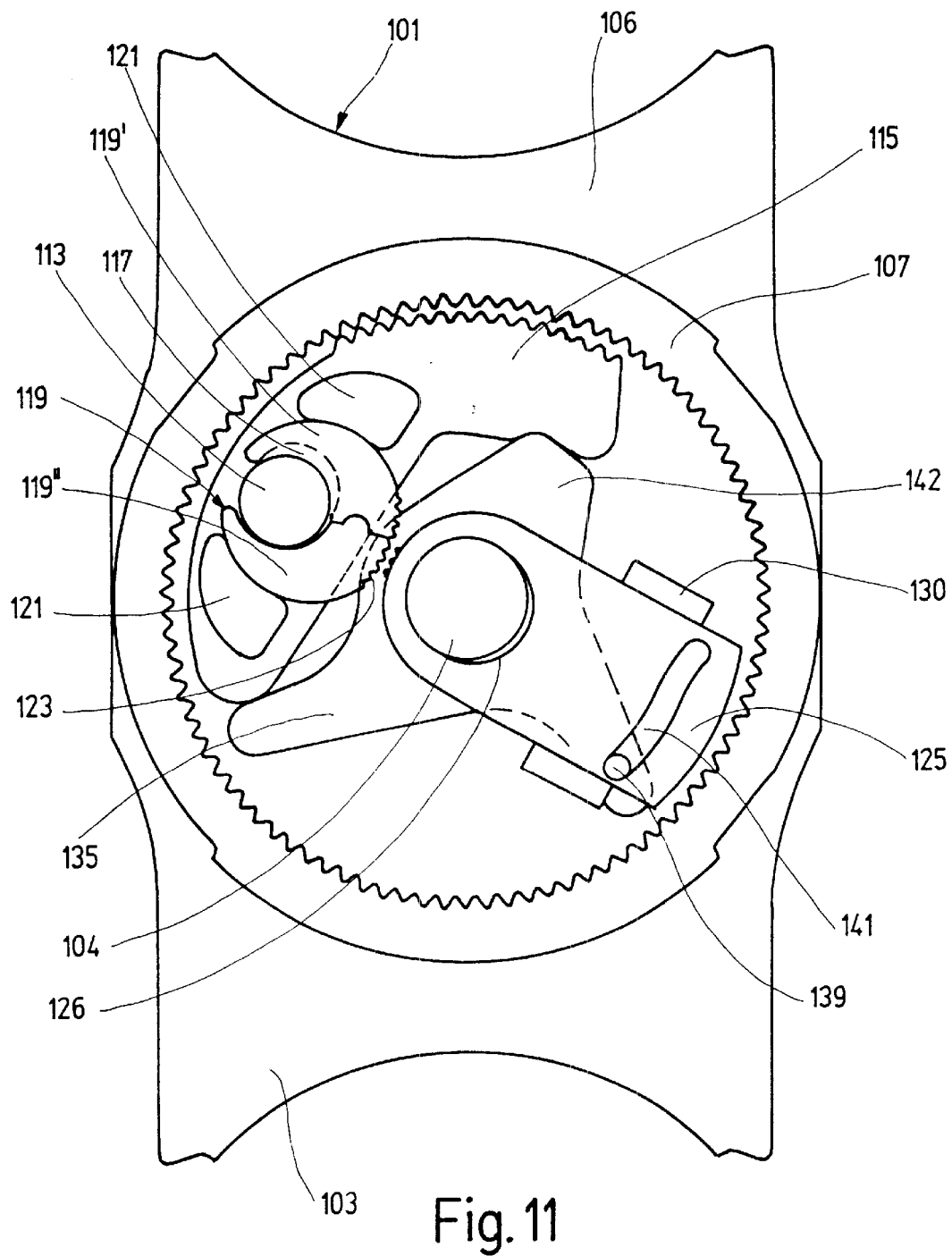
FIG. 11 is a partially sectioned side view of a locking mechanism as a second adjuster according to the invention in a disengaged state.

To disengage the locking mechanism, the control member 135 is slightly rotated (clockwise in the drawing) by engaging its third arm, so that the control pin 139 moves within the guide slot 141 to the radially further inward situated end. This causes the locking slide 125 to move radially outward and to release the cam plate 119. The clamping arm 142 now releases pawl 115, so that it is able to swing back in the freely movable state of cam plate 119, and to disengage from gear rim 107. At the same time, the pawl 115 forms a stop for the third arm of control member 135. The upper part 106 of the locking mechanism can now be rotated from its position shown in FIG. 11 relative to the lower part 103 of the locking mechanism.

To engage the locking mechanism 101, the control member 135 is rotated (counterclockwise in the drawing) by engaging its third arm, and caused to contact the pawl 115 with its clamping arm 142, thereby pivoting the pawl 115 in the direction toward the gear rim 107. As soon as the pawl 115 comes into contact with the gear rim 107, an offset of the gear tooth systems is compensated by the floating mount of pawl 115, i.e., the pawl 115 moves its elongate hole 117 relative to the pawl pin 113, thereby allowing the clamping arm 142 to push the pawl 115 deeper into the gear rim 107. At the same time, the cam plate 119 comes to lie against bearing members 121, while eliminating or minimizing its play. The control pin 139 approaches again the radially further outward situated end of guide slot 141, thereby pushing the locking slide 125 radially inward toward the cam plate 119. In the final state, the locking slide 125 engages with its teeth the gear tooth system 123 of clam plate 119 and blocks same. At the same time, the clamping arm 142 forces the teeth of the pawl 115 against teeth of the gear rim 107.

The locking mechanism 101 is used in combination with a vehicle seat in a manner similar to as the adjuster 1 of the first embodiment shown in FIG. 8.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An adjuster for a vehicle seat, comprising:
   a bearing element;
   a toothed element comprising a plurality of teeth, wherein the toothed element is mounted to be capable of moving relative to the bearing element; and
   a pawl floatably supported by the bearing element to be capable of:
      floating into a locked position by pivoting into contact with at least one tooth of the toothed element and moving along the toothed element to permit a proper engagement between the pawl and the teeth of the toothed element; and
      moving into an unlocked position in which the pawl is disengaged from the teeth of the toothed element;
   wherein the bearing element is part of a housing and the toothed element is generally straight and carried by the housing so that relative movement along a generally straight path can be achieved between the housing and the toothed element while the pawl is in the unlocked position, so that the adjuster can function as a linear adjuster.

2. An adjuster according to claim 1, wherein the toothed element is connected to a part so that relative movement between the bearing element and the part is restricted while the pawl is in the locked position, whereby the adjuster is a locking element.

3. An adjuster according to claim 1, further comprising an eccentric element mounted to be capable of rotating relative to the bearing element and operative to rotate in response to the movement of the pawl along the toothed element.

4. An adjuster according to claim 3, wherein the eccentric element comprises two pieces.

5. An adjuster according to claim 3, further comprising a locking element operative for engaging and restricting the rotating of the eccentric element so that the eccentric element restricts at least the movement of the pawl along the toothed element.

6. An adjuster according to claim 1, in combination with a vehicle seat including a seat structure comprising a seat part that is connected to at least a component of the adjuster selected from the group consisting of the bearing element and the toothed element, so that movement of at least the seat part is restricted while the pawl is in the locked position.

7. An adjuster for a vehicle seat, comprising:
   a bearing element;
   a toothed element comprising a plurality of teeth, wherein the toothed element is mounted to be capable of moving relative to the bearing element;
   a pawl floatably supported by the bearing element to be capable of:
      floating into a locked position by pivoting into contact with at least one tooth of the toothed element and moving along the toothed element to permit a proper engagement between the pawl and the teeth of the toothed element; and
      moving into an unlocked position in which the pawl is disengaged from the teeth of the toothed element;
   an eccentric element mounted to be capable of rotating relative to the bearing element and operative to rotate in response to the movement of the pawl along the toothed element; and
   a locking element operative for engaging and restricting the rotating of the eccentric element so that the eccentric element restricts at least the movement of the pawl along the toothed element, wherein the eccentric element comprises a plurality of teeth that are engaged by the locking element to restrict the rotating of the eccentric element.

8. An adjuster according to claim 7, further comprising a control member mounted for moving relative to the bearing element, wherein the control member is capable of engaging and moving the pawl along the toothed element while the control member moves relative to the bearing element.

9. An adjuster according to claim 7, further comprising a pivot carried by the bearing element, wherein the pawl defines an elongate hole through which the pivot extends, and wherein the hole and the pivot are sized and cooperate to allow the pivoting of the pawl and to allow the movement of the pawl along the toothed element.

10. An adjuster according to claim 7, wherein the teeth of the eccentric element are finer than the teeth of the toothed element.

11. An adjuster according to claim 7, wherein the plurality of teeth of the toothed element are arranged in an arc.

12. A combination comprising:
   an adjuster for a vehicle seat, comprising:
      a bearing element;
      a toothed element comprising a plurality of teeth, wherein the plurality of teeth are arranged generally in a straight row and the toothed element is mounted to be capable of moving relative to the bearing element;
      a pawl floatably supported by the bearing element to be capable of:
         floating into a locked position by pivoting into contact with at least one tooth of the toothed element and moving along the toothed element to permit a proper engagement between the pawl and the teeth of the toothed element; and
         moving into an unlocked position in which the pawl is disengaged from the teeth of the toothed element; and
   a vehicle seat including a seat structure comprising a seat part that is connected to at least a component of the adjuster selected from the group consisting of the bearing element and the toothed element, so that movement of at least the seat part is restricted while the pawl is in the locked position.

13. A combination according to claim 12, further comprising a pivot carried by the bearing element, wherein the pawl defines an elongate hole through which the pivot extends, and wherein the hole and the pivot are sized and cooperate to allow the pivoting and to allow the movement of the pawl along the toothed element.

14. A combination according to claim 12, further comprising an eccentric element mounted to be capable of rotating relative to the bearing element and operative to rotate in response to the movement of the pawl along the toothed element.

15. A combination according to claim 14, further comprising a locking element operative for engaging and restricting the rotating of the eccentric element so that the eccentric element restricts at least the movement of the pawl along the toothed element.

16. A combination according to claim 12, further comprising a control member mounted for moving relative to the bearing element, wherein the control member is capable of engaging and moving the pawl along the toothed element while the control member moves relative to the bearing element.

17. A combination comprising:
    an adjuster for a vehicle seat comprising:
        a bearing element;
        a toothed element comprising a plurality of teeth, wherein the toothed element is mounted to be capable of moving relative to the bearing element;
        a pawl floatably supported by the bearing element to be capable of:
            floating into a locked position by pivoting into contact with at least one tooth of the toothed element and moving along the toothed element to permit a proper engagement between the pawl and the teeth of the toothed element; and
            moving into an unlocked position in which the pawl is disengaged from the teeth of the toothed element;
        an eccentric element mounted to be capable of rotating relative to the bearing element and operative to rotate in response to the movement of the pawl along the toothed element; and
        a locking element operative for engaging and restricting the rotating of the eccentric element so that the eccentric element restricts at least the movement of the pawl along the toothed element, wherein the eccentric element comprises a plurality of teeth that are engaged by the locking element to restrict the rotating of the eccentric element; and
    a vehicle seat including a seat structure comprising a seat part that is connected to at least a component of the adjuster selected from the group consisting of the bearing element and the toothed element, so that movement of at least the seat part is restricted while the pawl is in the locked position.

18. A combination according to claim 17, wherein the teeth of the eccentric element are finer than the teeth of the toothed element.

19. A combination according to claim 17, wherein the plurality of teeth of the toothed element are arranged in an arc.

* * * * *